Nov. 10, 1964 P. W. HEMMINGER 3,156,781

CALLED-LINE TONE-SIGNALING SYSTEM

Filed Aug. 5, 1960 2 Sheets-Sheet 1

INVENTOR.

PAUL W. HEMMINGER

BY

Kegan, Bellamy & Kegan

ATTORNEYS 3,156,781

CALLED-LINE TONE-SIGNALING SYSTEM

Paul W. Hemminger, Palisades, N.Y., assignor to International Telephone and Telegraph Corporation, New York, N.Y., a corporation of Maryland Filed Aug. 5, 1960, Ser. No. 47,700
10 Claims. (Cl. 179—84)

This invention relates to systems for giving a call signal to a busy called line that the line is being called, being concerned more particularly with systems for supplying an audible call signal to the called line exclusive of the other line with which it is in telephonic communication.

Heretofore, arrangements have been known wherein an audible call signal is given to busy called line indicative of a further attempt to make connection with that line, but such prior systems have been open to the drawback that such call signal is heard on the other line with which the busy called line is connected, thereby causing confusion in that two persons engaged in a telephone conversation are unable to ascertain from the call signal which one is wanted in the unsuccessfully attempted telephone connection indicated thereby.

According to the invention, the foregoing and other drawbacks of the prior systems have been eliminated and a practical satisfactory result has been reached by providing band-reject call-signal blocking apparatus for each connecting link structure of the switching system and by limiting the frequency of the call-signal current to the narrow frequency band rejected by the noted blocking structure, whereby a call signal applied to one called busy line of an existing telephone connection is blocked from reaching the other line to which it is connected.

In a preferred form of the invention the blocking apparatus is normally out of circuit to avoid blocking concerned ones of the voice frequencies, and suitable control apparatus is provided for introducing it into the conversation path concurrently with the call signal.

In desirable forms of the invention, each connecting link includes blocking-control relay apparatus controlled, from the calling line of an attempted connection to a busy line, by a control signal which takes the form of a direct current pulse, and the noted relay apparatus acts for the duration of the control pulse to effect the noted alteration in the connection path.

In one form of the invention, a band-reject filter is included serially in the conversation path of each noted connecting link by the noted relay apparatus while in another form a band-reject filter is introduced by the noted relay apparatus contemporaneously with application of the call tone.

In another form of the invention the conversation path between the connected telephone lines is interrupted for the duration of the operation of the noted relay apparatus.

The foregoing and other features and objects of this invention and the manner of attaining them will become more apparent, and the invention itself will be best understood, by reference to the following description of embodiments of the invention taken in conjunction with the accompanying drawings comprising FIGS. 1 to 4 wherein:

FIG. 1 diagrammatically illustrates a common switchboard arrangement for interconnecting telephone lines and arranged to incorporate structure embodying the invention;

FIG. 1

Figure 1:
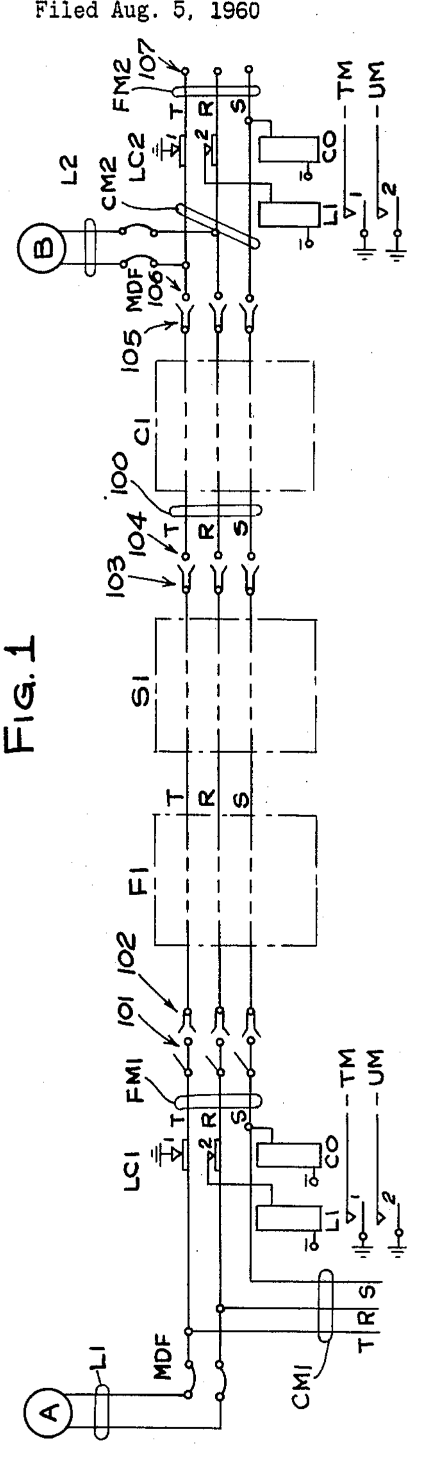

Referring particularly to FIG. 1, calling line L1 and called line L2 are equipped with telephone substations A and B respectively and enter the switch room through indicated jumpers on main distributing frame MDF. The lines are provided with respective line circuits LC1 and LC2. Each line circuit includes a line relay LI for signalling an initiated call and a cutoff relay CO for disconnecting the associated line relay during conversation.

As illustrated, line L1 has a three-wire connector multiple CM1 at the switchboard through which the line is called, and has a finder multiple FM1 at the switchboard through which calls from the line are extended.

FIG. 1 further shows a finder-selector link comprising the finder F1, with its three brushes 102, and the interlinked selector S1, with its three brushes 104. The brushes 102 of F1 are illustrated in association with finder-multiple terminals 101 of line L1, while selector brushes 103 are shown in association with switchboard terminals 104 of connector C1, reached over the 3-conductor connector trunk 100. The three-brush set 105 of connector C1 is shown in association with connector-multiple terminals 106 of line L2.

When a call is initiated from line L1, by the lifting of the usual receiver or hand set (not shown) at station A, a direct current bridge is thereby placed across the conductors of the line, operating line relay LI through contacts 1 and 2 of cutoff relay CO of LC1 to ground tens-marking and units-marking conductors TM and UM of LC1 to identify line L1 as the calling line. A finder such as F1 (for example) responsively operates its brushes 102 to effect connection with the calling line L1 through terminals 101, thereby extending the calling line to the selector S1, which is responsively prepared for operation in the well-known manner, and cutoff relay CO is operated over S of FM1 to disconnect and restore the line relay LI of LC1.

When the subscriber at substation A dials the first digit in the telephone number of line L2, the selector S1 (by apparatus not shown) raises its brushes 103 opposite the corresponding level of bank contacts and then rotates them in search of an idle connector trunk in that level. When that idle trunk is reached (for example, trunk 100) the selector S1 stops its brushes 103 thereon and switches the conductors of the calling line L1 through to the corresponding conductors T and R of the trunk. Thereupon the connector C1 is prepared for operation in the usual and well-known manner, and furnishes holding ground on conductor S of the connection to hold S1 and to hold CO of LC1 operated.

The connector C1 responds to the dialing of the tens digit in the called number by raising its brushes 105 opposite the corresponding level of bank contacts. C1 rotates brushes 105 over the contacts in the selected level responsive to the units digit of the called number, until the brushes come to rest on terminals such as 106 of the called line L2. Connector C1 thereupon makes the usual busy test. If the line is idle the connector seizes the called line and operates the cutoff relay CO of the line circuit LC2 thereof, over S of CM2, to clear the called line L2 of the circuit path of its line relay LI.

C1 now applies ringing current to the called line to signal that a subscriber such as that at substation B is being called.

When the call is answered, the ringing current is discontinued and the connector C1 cuts through for conversation between ilnes L1 and L2.

When the conversation has been terminated, and the subscribers have both replaced their receivers, the connection is cleared out. Switches F1, S1, and C1 are thereby restored to normal condition in the usual manner by the removal of ground from the sleeve conductor S of the connection, and the cutoff relays CO of LC1 and LC2 restore.

FIG. 2

Figure 2:
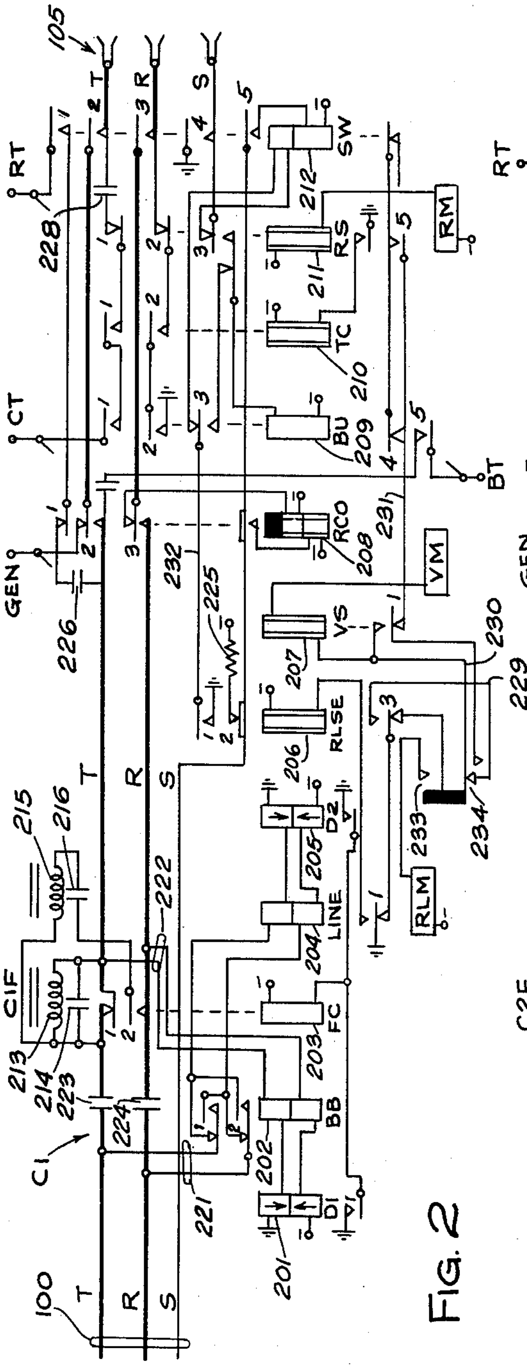
FIG. 2 is a circuit diagram of the connector C1 of FIG. 1 employing a band reject filter controlled according to the presence or absence of a control signal over one of the talking conductors.

Referring now to FIG. 2, the connector C1 includes relays 201 to 212, release magnet RLM, vertical magnet VM, and rotary magnet RM. The connector further includes the coupling or talking condensers 223 and 224, and a filter CIF is incorporated according to the invention.

When the connector C1 of FIG. 2 is idle, all of the relays thereof are restored, and idle-indicating battery is placed on sleeve conductor S of trunk 100 through resistor 225 and back contact 2 of release relay 206 to indicate the idle condition of trunk 100 and of C1.

When trunk 100 is seized, as by the selector S1 as described in connection with FIG. 1, ground potential is temporarily extended forward by the seizing selector S1 to ground conductor S of 100 to mark trunk 100 and connector C1 as busy to other selectors having access to them. At the same time, the calling line (such as L1 of FIG. 1) is extended over the connection to conductors T and R of trunk 100, and thence over local conductors 221, contacts 1 and 2 of back-bridge relay BB, and through the windings of line relay 204 to the usual central-battery current supply, by way of differential relay D2. Line relay 204 thereupon operates over the calling line, but differential relay D2 is not now operated.

Upon operating, line relay 204 operates release relay 206 at its front contact 1. At its contacts 1, release relay 206 prepares a testing circuit for use after dialing has been completed; at its contacts 2 it disconnects resistor 205 and places ground on sleeve conductor S of trunk 100 to maintain switches F1 and S1 operated and to maintain cutoff relay CO of LC1 operated; at its contacts 3 it opens a point in the circuit of release magnet RLM and prepares a circuit for vertical magnet VM.

When the calling subscriber dials the tens digit in the called number, a corresponding number of momentary interruptions is produced in the calling line, thereby momentarily restoring line relay 204 a corresponding number of times. One each restoration of line relay 204, release relay 206 is momentarily open-circuited, but remains operated throughout dialing because of its slow restoring character indicated by the representation of a copper sleeve surrounding the core of the relay. Relays VS, RCO, TC and RS are similarly sleeved to render them slow-restoring.

With release relay 206 held continuously operated during dialing, each momentary restoration of line relay 204 closes a circuit for vertical magnet VM, the circuit at the moment of its first closure being through back contact 1 of relay 204, front contact 3 of relay 206, conductor 239, normally closed contacts of off-normal set 234, conductor 230, and the winding of slow-release vertical-series relay 207, to vertical magnet VM. Vertical magnet VM is operated one vertical step for each received impulse, raising the brushes 105 step by step until they come to rest opposite the called level of bank contacts. Vertical-series relay 207 operates in series with the vertical magnet on the first step thereof. Being slow-restoring, it remains operated throughout the series of stepping impulses. At its front contact 1 it completes a new circuit for the vertical magnet and relay 207 which (on the operation of off-normal contacts 234 on the first vertical step) includes the normally open contacts of set 234 and the front contact of armature 1 of relay 207.

When the series of impulses to magnet VM is terminated, relay 207 restores and transfers the stepping circuit from conductor 230 for magnet VM to conductor 231 for rotary magnet RM.

When the next and final digit (units) in the called number is dialed, line relay 204 responds as before to transmit a series of stepping impulses. At this time, each of the stepping impulses is delivered to rotary magnet RM by way of back contact 1 of relay 206, conductor 231, contacts 4 of busy relay 209, and contacts 6 of switching relay 212. Rotary magnet RM consequently steps brushes 105 around until they come to rest on the contacts of the called line, such as 106 (FIG. 1) of line L2. Rotary series relay 211 operates in multiple with magnet RM on the first rotary step. Being slow-restoring, it remains operated throughout the series of impulses. Conatcts 1 and 2 of relay 211 open points in signaling connections to the T and R brushes of set 105; contacts 3 disconnect brush S of set 105 from the test winding of switching relay 212 and connect it to the winding of busy relay 209 to conduct a busy test of the called line; and contacts 5 operate slow-restoring tone-control relay 210.

During the rotary stepping movement, busy relay 209 is operated over brush S of 105 each time a busy line is encountered, but that causes no harm to result because of the operated condition of relay 211, whose contacts 5 shunt contacts 4 of 209.

If the called line is busy when called, busy relay 209 is operated from busy-indicating ground on the sleeve conductors thereof and through brush S of set 105 and front contact 3 of relay 211. Then, when relay 211 restores and disconnects the sleeve brush from relay 209, relay 209 remains locked in a locking circuit from ground through contacts 1 of release relay 206, conductor 232, front contact 3 of relay 209, and normally closed contacts 3 of relay 211, to the winding of relay 209. At its contacts 5, relay 209 applies a busy tone to the calling line by way of isolating condenser 227, thereby informing the calling subscriber of the busy condition of the called line. With relay 211 restored, the impulsing circuit to magnet RM and relay 211 is open at contacts 4 of 209.

During the interval that slow-restoring tone-control relay TC remains operated after rotary-series relay 211 has restored, calling tone from common conductor CT is applied to the tip conductor T of called line L2 by way of contacts 1 of relays 210, 211, and 212, notifying the subscriber at station B of FIG. 1 that he is being called. Also, during the same interval, control ground is applied through contacts 2 of relays 209, 210, and 211, to the ring brush R of set 105, thereby applying control ground for that interval to the ring conductor R of the called line L2 to unbalance the current flow over the called line for that interval.

If the called line tests busy because included in a connection (either as calling line or as called line) with another line through another connector similar to the connector C1 of FIG. 2, the unbalanced current flow over the called line causes the concerned one of the differential relays D1 and D2 of the noted other connector to operate, thereby operating its associated filter-control relay corresponding to 203 of C1. Such filter-control relay in the noted other connector opens its contacts 1 and closes its contacts 2. Contacts 1 of the relay introduces the series arm 213, 214 of the associated filter CIF into the talking path, and its contacts 2 place shunt arm 215, 216 of the filter across the talking path. Thereby, the calling tone applied to the called line as described is prevented from reaching the other line with which the called line L2 is telephonically connected. This result obtains because filter CIF is a band-reject filter which rejects the frequency band within which the frequency of the tone signal over common supply conductor CT is included. Preferably this rejected band is sufficiently narrow that most voice frequencies are not blocked by filter CIF. For example, the blocked band may be from 1100 to 1200 cycles.

When slow restoring relay 210 restores, its contacts 1 terminate the application of calling tone to the called line, and its contacts 2 terminate the application of ground potential to conductor R of the called line, thereby permitting restoration of the operated one of the differential relays D1, D2 of the concerned connector. The associated filter control relay 203 is thereby restored to remove the band-reject filter CIF from the connection between the connected lines.

Upon calling a busy line and hearing the noted busy tone, the calling subscriber is expected to replace his receiver to clear out the connection, in the usual manner.

If the called line is idle when called, busy relay 209 is in restored condition when rotary-series relay 211 restores, whereby no control current nor calling-tone current is transmitted to the called line. Instead, the upper winding of switching relay 212 is included in a testing circuit of the called line from ground through contacts 1 of 206, conductor 232, back contact 3 of busy relay 209, upper winding of relay 212, back contact 3 of relay 211, and thence through sleeve brush S of 105, to battery through the winding of the cutoff relay of the called line, such as CO of line circuit LC2 of FIG. 1. This cutoff relay is operated over the test circuit to disconnect the associated line relay for ringing and talking. At the same time, switching relay 212 is effectively energized by its upper winding in the traced test circuit. At its contacts 5, switching relay 212 closes a local locking and holding circuit through the lower winding of relay 212 from ground on the associated sleeve conductor; its contacts 6 disconnect rotary magnet RM and relay 211; its contacts 4 directly ground the associated sleeve wiper S of set 105 to by-pass the upper winding of relay 212; its contacts 2 and 3 effect connection with brushes T and R of set 105 to close the ringing circuit and prepare the talking circuit; and its contacts 1 apply ringing current by way of contacts 1 of relay 208 and limiting condenser 226 to the calling line as a signal that ringing current is being applied to the called line. The ringing current reaches the called line from the common generator lead GEN through back contact 2 of relay 208, contacts 2 of relay 212, and brush T of set 105, and returns by way of brush R of set 105, contacts 3 of relay 212, back contact 3 of relay 208, and through the upper winding of relay 208 to battery.

Ring-cutoff relay 208 does not operate during the ringing period despite the alternating ringing current traversing its upper winding. On the other hand, when the call is answered, the direct-current bridge thereby placed across the conductors of the called line permits direct current to flow through the upper winding of relay 208, operating relay 208 sufficiently to close its lightly adjusted contacts 4. An operating and holding circuit is thereby closed for relay 208 from ground through front contact 2 of relay 206, contacts 4 of relay 208, for the lower winding of relay 208. Contacts 1 of relay 208 open the ringing-tone circuit, and contacts 2 and 3 thereof open the ringing circuit and complete the talking circuit. The calling and called subscribers may now converse as desired.

Back-bridge relay 202 supplies talking current to the called line over conductors 222, such current being obtained through the windings of differential relay 202. Ordinarily, relay 201 is not energized because the called line is not unbalanced, but it controls relay 203 as described when energized under the described circumstances. Back bridge relay 202, through a double make-before-break arrangement effects a reversal of current flow over the conductors of the calling line for any usual or desired supervisory purpose.

When the conversation is finished back-bridge and line relays 202 and 204 are restored upon the receivers being replaced on the respective lines. Restoration of line relay 204 permits release relay 206 to restore shortly. Relays 208 and 212 are thereby unlocked and restored. Release magnet RLM is now energized through back contact 1 of relay 204, back contact 3 of relay 206, and off-normal contact set 233. The switch mechanism and brush set 105 are thereby restored to normal condition in the usual manner, whereupon the release magnet circuit is opened at off-normal contacts 233, leaving the connector C1 in normal condition.

FIG. 3

Figure 3:
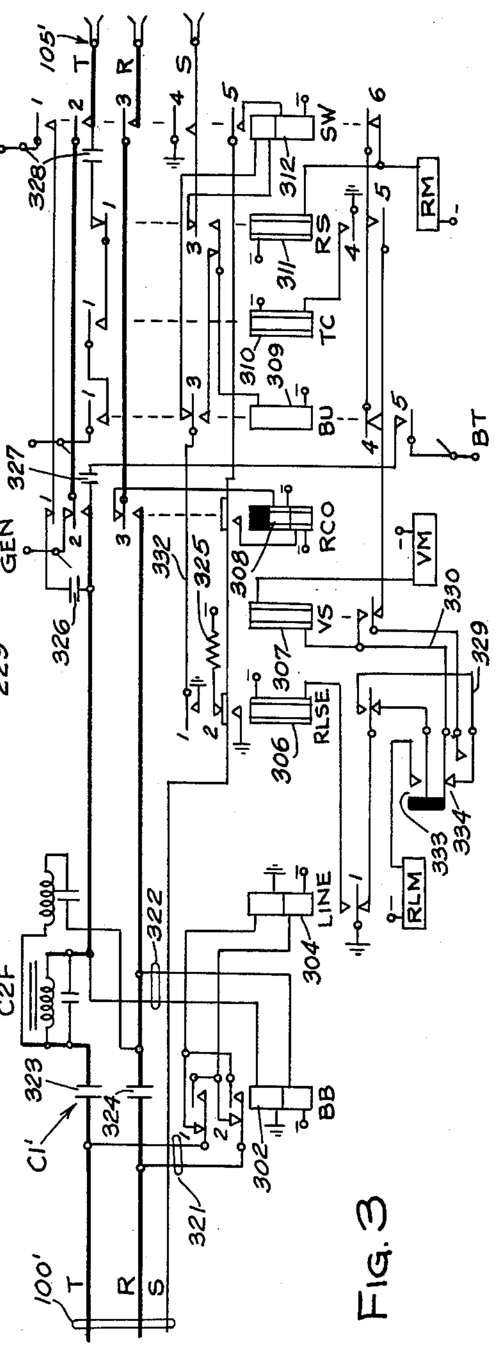
FIG. 3 shows connector C1′, similar to the connector C1 but modified to leave the band-reject filter in the connection at all times, thereby rendering the noted controlling relay apparatus unnecessary.

Connector C1′ of FIG. 3 (with its incoming trunk 100′, band-reject filter C2F, and brush set 105′) is similar to the connector C1 of FIG. 2 except that its call-signal-blocking filter C2F is continuously in circuit, wherefore differential and filter-control relays corresponding to relays 201, 205, and 203 of FIG. 2 are not required in FIG. 3.

In FIG. 3, signals in the 1100 and 1200 cycle band applied on either side of filter C2F are prevented C2F from reaching the other side thereof. Therefore, when either of two lines telephonically, interconnected by connector C1′ is called, the pulse of narrow-band call-signal tone applied to the called line as described for FIG. 2 is prevented by C2F from reaching the other line to which the called line is connected through C1′.

For ready comparison with the respectively corresponding parts of FIG. 2, the numbered items in FIG. 3 are given corresponding reference characters in the 300 series. See, for example, relays 302 to 312, and conductor, condenser, and contact items 321 to 334.

In the operation of connector C1′ of FIG. 3, when brush set 105′ is advanced as described onto the contacts of a busy called line, slow relays 311 and 310 are energized, and busy relay 309 energizes through brush S of set 105′ to become locked when relay 311 restores. Under this condition, when 311 restores, and pending restoration of slow relay 310, a pulse of call-signal tone is placed on the busy called line as a being-called signal. That signal is blocked from reaching the other line with which the called line is connected, by the blocking filter in the concerned connector in use corresponding to filter C2F of connector C1′. It is clear that the being-called signal is withheld from an idle called line by the failure of busy relay 209 to be operated when the idle line is called.

FIG. 4

Figure 4:
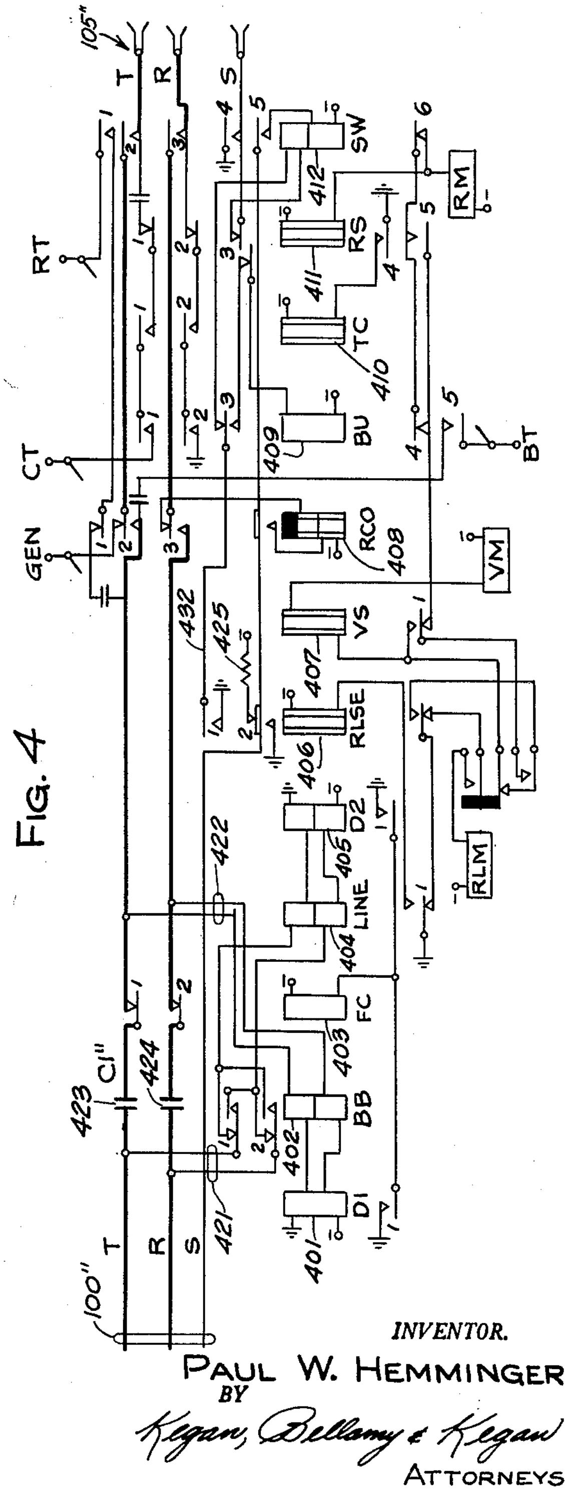
FIG. 4 shows connector C1″ which is arranged to open the talking connection entirely for the duration of the noted control signal.

The connector C1″ is arranged to open the talking connection entirely when relay 403 responds to the momentary operation of either of the different detector relays 401 or 405. Accordingly, no filter corresponding to C1F of FIG. 2 is required in FIG. 4 to restrict the call-signal tone to the called line. Otherwise connector C1″ may be the same as connector C1 of FIG. 2. Accordingly, the operation of the connector of FIG. 4 does not require a separate description other than to note that each of the contact sets 1 and 2 of control relay 403 opens a separate one of the illustrated talking conductors of C1″, thereby completely breaking the telephonic connection for the duration of the described application of call-signal tone to the busy called line.

While I have described above the principles of my invention in connection with specific apparatus, it is to be clearly understood that this description is made only by way of example and not as a limitation to the scope of my invention.

I claim:

1. A telephone system comprising a plurality of subscriber lines, an automatic switching network including a plurality of connecting means for selectively interconnecting said lines to complete paths between calling and called lines, means for busy marking both said calling and called lines to guard against double seizure, means responsive to a call to a busy line for applying a distinctive call signal to said busy line while precluding the establishment of a voice connection to said busy line, and means for blocking the transmission of said distinctive call signal to any other line which may be connected to said busy line.

2. An automatic switching system according to claim 1, wherein each said connecting means includes a busy-test relay and means controlled thereby for applying the said call signal to any called line subject to such line being busy.

3. An automatic switching system according to claim 2, wherein each said connecting means includes a timing relay and means controlled thereby for terminating the said application of call signal to the busy called line at the end of a predetermined interval.

4. An automatic switching system according to claim 1, wherein any said blocking means includes an associated actuating means for opening the connection to the calling line, and means for operating the actuating means concurrently with the said application of a call signal to the called line.

5. An automatic switching system according to claim 4, wherein the said means for operating the said actuating means includes means for operating it over either of the two lines connected by a said connecting means, the last said means including means in any said connecting means which attempts a connection to a busy called line for closing thereover a circuit for operating the said actuating means.

6. In an automatic switching system including lines and a plurality of connectors, means for extending any calling line to any connector, means controlled over the calling line for operating any such connector to select any desired called line, means for thereafter testing said called line for busy or idle conditions, means in any connector responsive to the called line testing busy when called for making an application of call-signal current, for making an application of control current to the busy called line and for precluding a voice connection to the busy called line, and blocking means responsive to the control current for blocking the call-signal current from reaching the other line with which the busy called line is connected.

7. In an automatic switching system according to claim 6, each said connector having the said blocking means, the blocking means for any connector comprising a blocking relay and means for operating it responsive to control current over either line of a pair of lines connected together by the connector.

8. In an automatic switching system according to claim 7, the said means for operating the said blocking relay of any said connector comprising a separate differential relay associated with each of the lines connected together by the connector, each differential relay being responsive to the said control current received over the associated line.

9. In an automatic switching system according to claim 6, wherein the said blocking means for any pair of connected lines includes a normally ineffective band-reject filter and relay means for inserting it to reject a predetermined band of frequencies which includes the frequency of the said call-signal current.

10. In an automatic switching system according to claim 6, wherein the said blocking means includes a relay responsive to the said control current to interrupt the connection between the lines already connected together.

References Cited by the Examiner

UNITED STATES PATENTS

| | | | |
|---|---|---|---|
| 2,244,596 | 6/41 | Anderson | 179—27 |
| 2,252,857 | 8/41 | McAndrew et al. | 179—27 |
| 2,332,290 | 10/43 | Baumfalk | 179—27 |
| 2,339,669 | 1/44 | Baumfalk | 179—27 |
| 2,377,544 | 6/45 | Durkin | 179—27 |
| 2,510,011 | 5/50 | Corbett | 179—18 |
| 2,911,478 | 11/59 | Lomax | 179—84 |

ROBERT H. ROSE, *Primary Examiner.*

L. MILLER ANDRUS, WALTER L. LYNDE, *Examiners.*